United States Patent [19]

Ogura

[11] 4,383,591
[45] May 17, 1983

[54] APPARATUS FOR GENERATING P WAVES AND S WAVES

[76] Inventor: Kimio Ogura, 1413-3 Mimuro, Urawa-shi, Saitama-ken, Japan

[21] Appl. No.: 215,929

[22] Filed: Dec. 12, 1980

[30] Foreign Application Priority Data

Dec. 29, 1979 [JP]  Japan .................. 54-172279
May 23, 1980 [JP]  Japan .................. 55-068718
Jun. 6, 1980 [JP]  Japan .................. 55-076234

[51] Int. Cl.³ .......................... G01V 1/40; G01V 1/14
[52] U.S. Cl. ................................ 181/106; 181/120; 367/75; 367/912
[58] Field of Search ............... 367/25, 31, 75, 912; 181/102, 106, 120, 121; 166/249, 250; 175/50, 293; 73/576, 668

[56]  References Cited

U.S. PATENT DOCUMENTS

| 2,522,433 | 9/1950 | Dahlberg | 181/106 |
| 3,221,833 | 12/1965 | Malmberg | 181/106 |
| 3,287,696 | 11/1966 | Chabt et al. | 181/121 |
| 3,302,744 | 2/1967 | Levin | 181/121 |
| 3,716,111 | 2/1973 | Lavergne | 367/75 |
| 3,741,333 | 6/1973 | Moniz et al. | 181/120 |
| 4,042,063 | 8/1977 | Waters | 181/106 |
| 4,118,994 | 10/1978 | Layotte et al. | 367/75 |
| 4,207,961 | 6/1980 | Kitsunezaki | 181/106 |
| 4,222,455 | 9/1980 | Lerwill | 181/121 |

FOREIGN PATENT DOCUMENTS

| 612569 | 9/1932 | Fed. Rep. of Germany | 181/121 |
| 2001439 | 1/1979 | United Kingdom | 181/121 |
| 650037 | 8/1979 | U.S.S.R. | 181/106 |

OTHER PUBLICATIONS

Kitsunezaki, "A New Method for Shear—Wave Logging", 10/31/78, pp. 1489-1506, 48th Anniv. Int. SEG Meeting, S.F., Calif.
Schwarz et al., "A Technique . . . Marine Foundations", 5/8/74, O.T.C., vol. 1, pp. 755-762, OTC 2014.
Carabelli, "L'Impiegor del . . . Fondaziane", 1968, pp. 91-101, Ballet. Geog. Teor. Ed. Appl., vol. X, #38.

Primary Examiner—Nelson Moskowitz
Attorney, Agent, or Firm—Wenderoth, Lind & Ponack

[57]  ABSTRACT

An apparatus for generating P waves and S waves in a ground formation for a geological survey and the like. The apparatus has a percussive device which is driven to abruptly increase water pressure within a bore hole of the ground formation.

13 Claims, 11 Drawing Figures

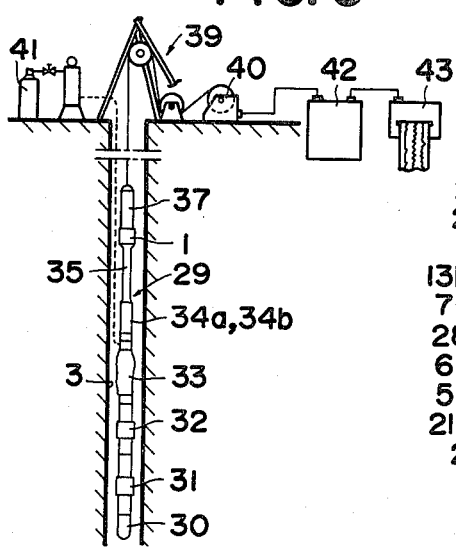
FIG. 5
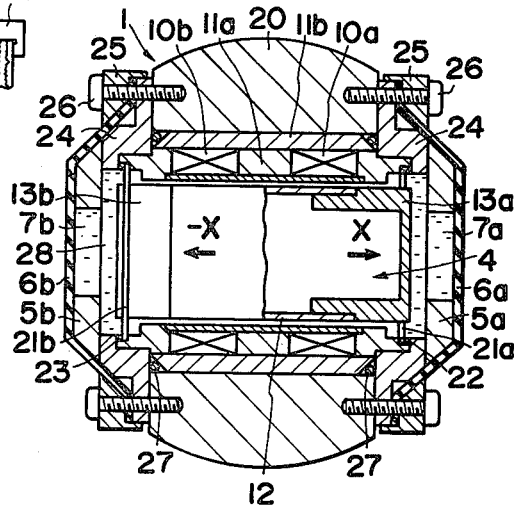
FIG. 8
FIG. 7

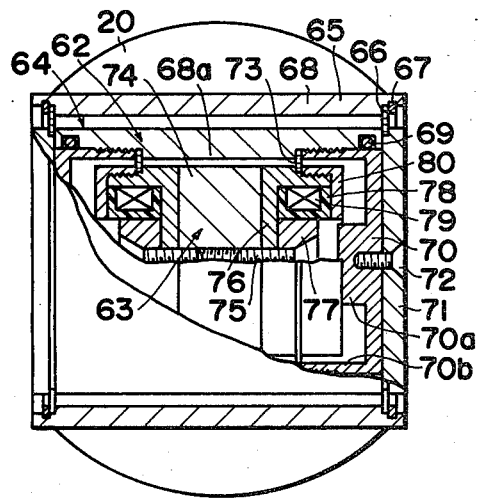
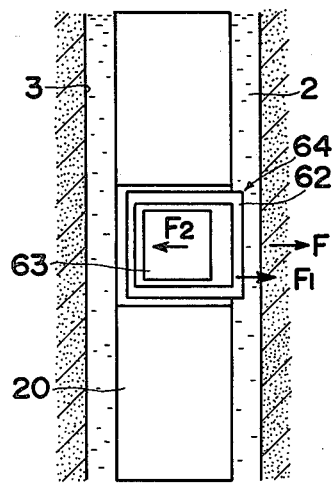
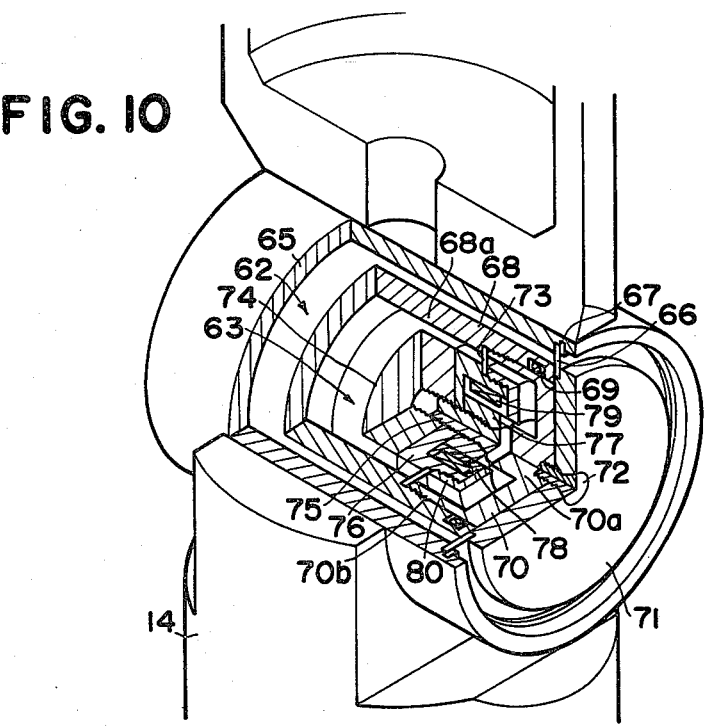

APPARATUS FOR GENERATING P WAVES AND S WAVES

BACKGROUND OF THE INVENTION

The present invention relates to an apparatus for generating P waves as well as S waves in a ground formation for the purpose of a geological survey and the like.

As is well known to those skilled in the art, the elastic or seismic waves propagated through the ground consist primarily of two types, namely longitudinal waves (P waves) and shear waves (S waves), wherein the shear wave is known to be a seismic body wave propagated in the deep formation of the earth by a shearing motion of material and is also known as a distortional wave. The terms P wave and S wave are used throughout the application to respectively mean the longitudinal wave and the shear wave of the elastic waves.

In recent years accurate data of the elastic waves have been required for the purpose of seismic or geological surveys in various fields such as civil engineering, architectural engineering, etc., wherein the propagation speed of P waves and S waves is directly measured within a bore hole so that necessary geological characteristics can be obtained. At present, however, a device for detecting only P waves is practically available. This is due to the fact that while a P wave is readily recognized because of its faster propagation and larger amplitude than S waves, the S wave is often influenced and disturbed by the P wave, resulting in a difficulty in the recognition or discrimination of an S wave.

An attempt has been made to effectively radiate only S waves while minimizing the radiation of P waves, as disclosed in U.S. Pat. No. 4,207,961 to Kitsunezaki, issued June 17, 1980, and assigned to the present assignee, in which an exciting method of S waves is provided. The method incorporates inserting a wave source into a bore hole which contains water and actuating an operation device in the wave source to impart an exciting force to the bore hole wall through the water in the direction perpendicular to the axis of the bore hole, thereby generating an S wave which has characteristics of predominant directivity of radiation in the direction perpendicular to the axis of the exciting force. In the method, the water is abruptly ejected at one side of the wave source intersecting the axis of the exciting force while the water of equivalent volume is abruptly simultaneously sucked in at its opposite side. Thus, a positive and negative pressure change is indirectly applied through the medium of the water to the two respective sides of the bore hole wall intersecting the exciting force axis.

The aforementioned method will fulfill the requirements, and while it has met with some degree of success to a large extent, the method and apparatus disclosed in the aforementioned U.S. patent have resulted in some disadvantages. To be more specific, there is a case which will necessitate the surveying of both P waves and S waves simultaneously in order to obtain an accurate data of the ground formation, as is required in such a case that geophysical quantities (i.e., propagation speed) based upon the P waves as well as the S waves is surveyed to obtain different quantities such as Poisson's ratio, by utilizing the surveyed geophysical quantities. If the waves source for only S waves is employed, an additional device or wave source for P waves must be independently installed at the other place of a probe while the wave source for S waves is attached to one place of the probe, or otherwise a separate survey should be conducted by lowering into the bore hole the probe for P waves after the probe for S waves is removed from the bore hole. However, the device disclosed in the aforementioned U.S. patent does not ensure an excitement of P waves and S waves at the same place, and moreover, it is more difficult to apply an exciting force if the position to be surveyed is deep in the ground. Furthermore, a surveying operation of P waves and S waves by different sources for P waves and for S waves will result in unreliability of geophysical quantities which have been obtained based upon the propagation speed of P waves and S waves, and results in difficulty in the evaluation of data errors obtained by the different wave sources which are possibly located at different places in the bore hole.

SUMMARY OF THE INVENTION

A principal object of the present invention is to provide an improved wave source which permits the generation of P waves and S waves simultaneously within a bore hole.

Another object of the present invention is to provide a wave source which permits an easy evaluation of P waves and S waves in a definite fashion.

A further object of the present invention is to provide a wave source which can selectively radiate P waves and S waves.

Another object of the present invention is to provide a wave source which can be operated without imparting any harmful force or influence on the observation, the harmful force being produced by a reaction of the wave source against a probe.

Briefly, a wave source according to the present invention has an operation mechanism for imparting an exciting force to a bore hole wall through bore hole water in the direction perpendicular to the axis of the bore hole so as to generate S waves having characteristics of predominant directivity of radiation in the direction perpendicular to the axis of the exciting force, wherein the wave source has a rigid body which is driven to move along the direction of the exciting force and a pair of planar members impactable by the movement of the rigid body to abruptly increase water pressure within the bore hole by the extent to which the planar members move by the impact of the rigid body, thereby permitting a radiation of P waves simultaneously with the radiation of S waves. The planar members are disposed at the opposite ends of the rigid body with a space between each of the planar members and rigid body.

The planar members which can be impacted by the rigid body may have an annular shape so that S waves can primarily be radiated by selectively driving the rigid body so as not to collide with the annular planar members, while P waves can be radiated by driving the rigid body into a collision with the annular planar members.

In a preferred embodiment of the invention, the rigid body may have a hollow body and a driving device mounted therein in such a manner that the hollow body is supported within a probe so as to be moveable in a direction perpendicular to the axis of the bore hole and that the driving device is supported within the hollow body so as to be moveable in the above-described direction. The hollow body and the driving device are driven in a relatively opposite direction so that a harmful, obstructive force due to a reaction thereof can be minimized.

Other objects and features of the present invention will become apparent from the detailed description of preferred embodiments thereof, which will be made with reference to the accompanying drawings. It is to be understood that the accompanying drawings and description are for the purpose of illustration only and do not limit the invention and that the invention will be defined by the appended claims.

BRIEF DESCRIPTION OF THE DRAWINGS

FIG. 5 is a diagrammatic view showing the inventive wave source placed into a practical use.

FIG. 7 is a diagram showing by way of example waveforms obtained by the inventive wave source.

FIG. 8 is a sectional view of a wave source according to another embodiment of the invention.

FIG. 9 is a sectional view of a wave source according to a further embodiment of the invention.

FIG. 10 is a fragmentary sectional view of the wave source illustrated in FIG. 9.

FIG. 11 is a diagram showing an operational mode of the wave source illustrated in FIGS. 9 and 10.

DETAILED DESCRIPTION OF THE INVENTION

Figure 1:
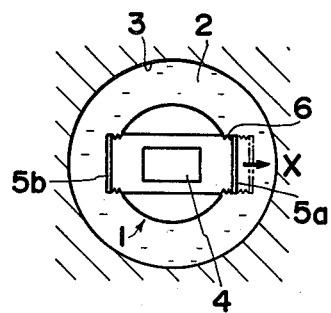
FIG. 1 is a schematic horizontal sectional view of an inventive wave source, showing an operational mode of the wave source.

In the first place, a basic structure and operation of the wave source according to an embodiment of the present invention will be described with reference to FIGS. 1 and 2. The inventive wave source which is generally indicated by reference numeral 1 is shown to be inserted deep into a bore hole 3 which contains water 2. The wave source 1 has a rigid body 4 which is movable in one direction within the wave source and plates 5a and 5b at the opposite ends of the rigid body 4 with a space between each of the plates and opposite ends of the rigid body. The plates 5a and 5b are projectable outwardly and the wave source 1 is constructed so as to be water-tight by means of a rubber seal 6.

When the rigid body 4 is driven in the direction indicated by an arrow "X" to collide with the plate 5a, the plate 5a is abruptly urged toward the arrow "X". Thus, an abrupt force is imparted only to a bore hole wall located in the direction "X" by way of a medium of water 2 in the bore hole 3, and the pressure in the bore hole 3 is increased by the extent to which the plate 5a is moved by the impact of the rigid body 4. Accordingly, both the S wave produced by the force in the direction "X" and the P wave produced by the pressure change can be measured at a surveying position which is greatly spaced apart from the wave source relative to a diameter of the bore hole.

The impact between the rigid body and the plate 5a produces a force in the form of a simple pulse, which will facilitate discrimination, in data recording, of the P waves from the S waves. When the exciting force is applied in the opposite direction, as illustrated by an arrow "−X", the phase of only the S waves is reversed and then recorded to permit an easy recognition or discrimination of the S wave.

Figure 2:
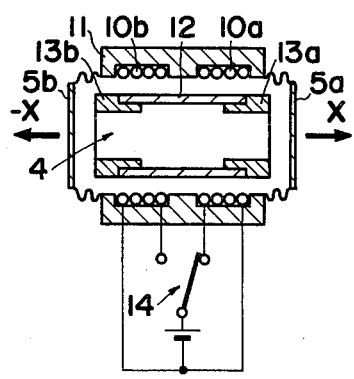
FIG. 2 is a schematic vertical sectional view of the wave source, showing a driving mode of a rigid body movably mounted within the wave source.

The rigid body 4 in the wave source 1 is electromagnetically driven as illustrated in FIG. 2. The wave source 1 has magnetic yokes, generally indicated by 11, mounted in a housing. The magnetic yokes 11 contain coils 10a and 10b. The rigid body 4 has a cylindrical magnetic plunger 12 and percussive rings 13a and 13b attached to the ends of the plunger 12 to protect the plunger. The coils 10a and 10b constitute a bidirectional solenoid, and the rigid body 4 is driven in either direction "X" or "−X" by means of a switch 14 for supplying an electric current to either coil 10a or coil 10b. Outwardly projectable plates 5a and 5b are mounted adjacent to the opposite ends of the rigid body 4.

Figure 4:
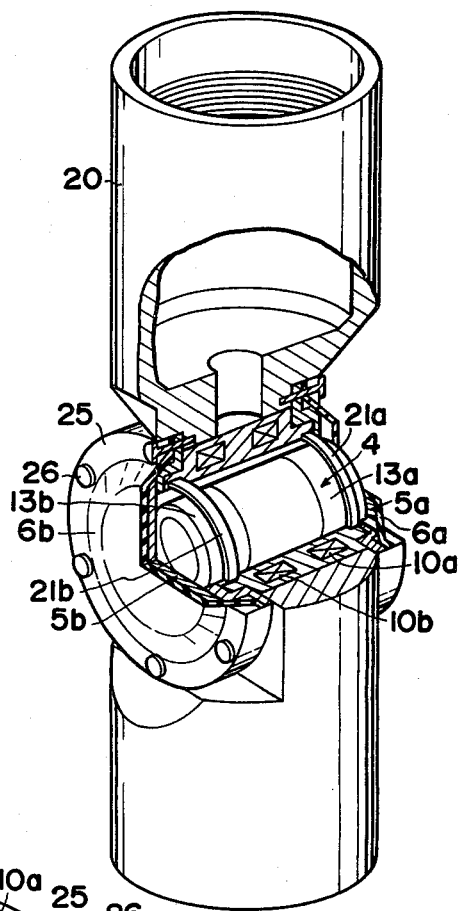
FIG. 4 is a fragmentary perspective view of the wave source mounted to a probe.
Figure 3:
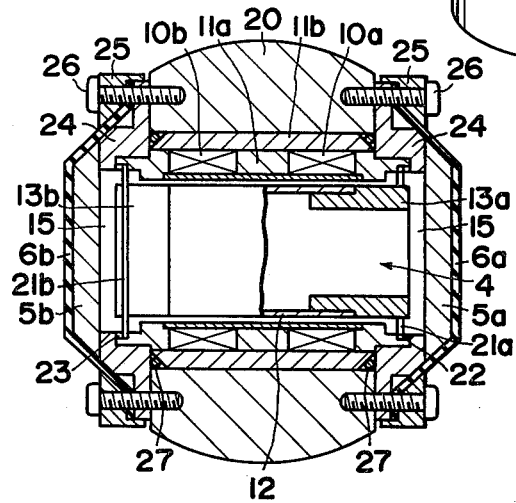
FIG. 3 is a sectional view of a wave source embodying the present invention.

Referring now to FIGS. 3 and 4 which show a more specific structure of a wave source in accordance with an embodiment of the invention, a cylindrical housing 20 has a through-hole perpendicular to an axis of the cylindrical housing 20 for securing therein a rigid body 4. On the inner surface of the through-hole are provided yokes 11a and 11b of pure iron and coils 10a and 10b mounted in the yokes 11a and 11b, respectively. The rigid body 4, incorporating a plunger 12 and rings 13a and 13b, is supported within the housing 20 by spiral springs 21a and 21b, so that the rigid body 4 is movable along an axis of the through-hole of the cylindrical housing 20. The spiral springs 21a and 21b are anchored by C-ring 22 and 23, respectively. Percussive plates 5a and 5b are disposed adjacent the opposite ends of the rigid body 4 with a space 15 between the rigid body 4 and the plates 5a and 5b. The plates 5a and 5b are covered with rubber sealing layers 6a and 6b, respectively, for the purpose of waterproofing the assembly and the plates 5a and 5b are attached to the housing 20 by means of the sealing layers 6a and 6b which are resiliently fixed to the housing 20 by inner rings 24, outer rings 25 and bolts 26. Reference numeral 27 represents O-rings for sealing the connection between the yokes 11a and 11b and the inner rings 24. The plates 5a and 5b are resiliently contacted to the inner rings 24 so that an inward movement of the percussive plates 5a and 5b is limited while the plates 5a and 5b are projectable outwardly against a resilient force of the sealing layers 6a and 6b, the sealing layers also having a function to prevent the water in the bore hole from penetrating into the housing 20 when one of the plates 5a and 5b is impacted to project outwardly by driving the rigid body 4.

The wave source 1 constructed as described above is inserted into a bore hole 3 combination with other devices such as an array of receivers, as illustrated schematically in FIG. 5 wherein the wave source and the other devices form a linear probe 29 for a practical use. The probe 29 has, from the bottom, a weight 30 for facilitating insertion of the probe into the bore hole 3, floating type receivers 31 and 32 having therein, respectively, a vertical vibration detector for P waves and a horizontal vibration detector for S waves, a filter tube 33 for shielding sound waves in the bore hole, the sound waves disturbing a detecting operation of S waves. Above the filter tube 33, there are provided, in turn, preamplifiers 34a and 34b, a damper 35 for damping obstructive waves which are often propagated throughout the probe 29, the inventive wave source 1, and a driving device 37 for driving the wave source 1. The probe 29 is lowered deep into the bore hole 3 by means of a sheave 39 and a winch 40 installed on the ground. Also installed on the ground are a gas cylinder 41 for supplying gas to the filter tube 33, a controlling device 42 and recorder 43 such as an electromagnetic oscillograph. The elements and devices illustrated in FIG. 5 are known in the art except for the inventive wave source 1, and any further detailed description will not be made with reference to the known elements and devices.

Figure 6:
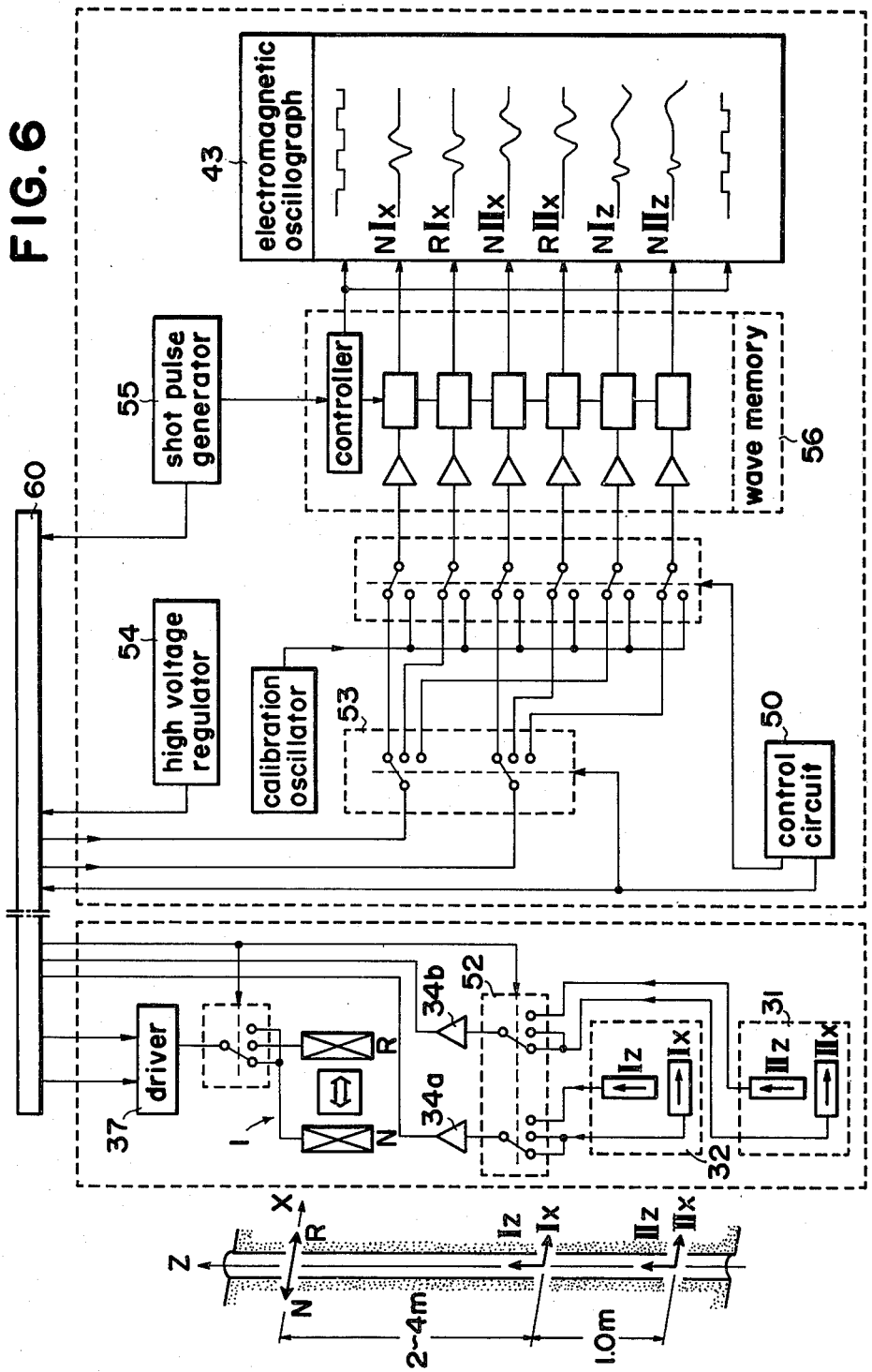
FIG. 6 is a block diagram of a measurement device employable to the wave source according to the present invention.

FIG. 6 shows an exemplified measurement circuit employable in the wave source of the present invention. A control circuit 50 controls the driving of the rigid body 4 to either the "N" or "R" direction and also controls input shift devices 51, 52, and 53. The input shift devices 51 and 52 select input signals Iz or Ix and input signals IIz or IIx, respectively. The input device 53 selects amplified signals from the preamplifier 34a, or 34b. The aforementioned driving device 37 is energized by a D.C. high voltage power source 54. Trigger pulses are applied to the driving device 37 by a trigger pulse generator 55 to drive the rigid body 4 of the inventive wave source 1 in either the "N" or "R" direction so that the plunger 12 is driven into collision with one of the plates 5a and 5b to abruptly project one of the plates 5a and 5b. Thus, P waves as well as S waves are radiated, and a 6-channel waveform memory 56 is triggered by the trigger pulses. The radiated S waves and P waves are detected by the aforementioned floating type receivers 31 and 32 and then amplified by the preamplifiers 34a and 34b. The amplified signals of S waves and of P waves are fed to the 6-channel waveform memory 56 and recorded on a recording paper by an 8-channel electromagnetic oscillograph 43. In FIG. 7 of the drawing reference numeral 60 represents a logging cable 55 for feeding signals and energy between the probe 29 and the control/memory device illustrated in FIG. 6.

FIG. 7 shows, by way of example, a record obtained by the process described above. As illustrated, both P waves and S waves are recorded on a substantially similar scale of amplitude. Discrimination of S waves is ensured by changing the driving direction of rigid body 4 to reverse the waveform. A necessary analysis on the obtained data can be carried out in a conventional manner and a detailed description will therefore not be made.

It is preferred that plates 5a and 5b are made of rigid material such as metals and that the sealing layers 6a and 6b for sealing the housing 20 and the plates 5a and 5b together have a spring constant small enough so as to not affect the projection of the plates 5a and 5b.

The wave source 1 permits a radiation of P waves and S waves at the same location within the bore hole 3. Obtained data of the both P waves and S waves can be utilized to produce reliable data of different geophysical quantities. Both S waves which are generated by an exciting force in the direction perpendicular to the axis of the exciting force and P waves which are generated by a compression force as a whole have a wave directivity toward the axis of the bore hole. Accordingly, the wave source and the receivers are advantageously mounted together to form a single probe. Reversing the impact direction, the waveshape of only the S waves are reversed and the S waves can be readily recognized. Furthermore, the exciting force generated by the impact is in the form of a simple pulse having a narrow pulse-width, and P waves and S waves can be readily discriminated from each other on the record. Besides, the wave source 1 can generate a force which is great enough relative to its size.

FIG. 8 shows a wave source according to another embodiment of the invention. Like parts are designated by the same reference numerals as those of FIG. 3. While the wave source described with reference to FIG. 3 is advantageous to a large extent in a general application, the wave source in FIG. 8 has a structure for meeting with a requirement for radiation of S waves in any ground formation without receiving a disturbance of P waves. The wave source which is generally designated by reference numeral 1 in FIG. 8 has a structure similar to that of the wave source of FIG. 3 except for the structure of the plates 5a and 5b and the structure of cup-shaped members 13a and 13b, which are correspondent, in a primary function, to the rings 13a and 13b of the previous embodiment shown in FIGS. 3 and 4. The plates illustrated in FIG. 8 have openings 7a and 7b, respectively, at their central portion to form an annular structure. The plates 5a and 5b, which are preferably made of metals are covered with rubber layers 6a and 6b for waterproofing and are resiliently held against the housing 20. The rubber layers 6a and 6b can also prevent the water in the bore hole 3 from penetrating into the housing 20. On the other hand, a clear liquid 28 such as silicone oil which has characteristics of electric insulation and of anticorrosion is filled in a space confined by the housing 20 and the rigid body 4. The liquid 28 has a function to impart, as a delivering media, a force which is produced when the rigid body 4 is driven so as not to collide with the plate 5a or 5b for generating S waves, and to equalize the pressure within the bore hole 3 and within the wave source 1.

The coils 10a and 10b constitute a so-called bidirectional solenoid and have a function to drive the solid body 4 in either the "X" or "−X" direction by selecting one of the coils by way of a switch which is referred to as the switch 14 of FIG. 2. By controlling an electric energy supplied to the coils 10a and 10b, the driving distance of the rigid body 4 can be adjusted.

An operational mode as well as the function of each of the elements in the wave source 1 are substantially similar to those of the wave source shown in FIGS. 3 and 4, and will be understood from the foregoing description, and a further detailed description will therefore not be made. However, according to the wave source illustrated in FIG. 8, P waves and S waves are selectively generated by driving the rigid body 4 into a collision with the plates 5a and 5b, and driving the rigid body 4 such that it does not collide with the plates, respectively. Recognition of S waves can be ensured by changing the direction of the exciting force to reverse the waveform. The wave source of this embodiment permits a precise logging of P waves and S waves regardless of condition of the ground formation since S waves and P waves are selectively measured solely, without receiving any disturbance of obstructive waves, by controlling the operation of the wave source 1.

FIGS. 9 through 11 show a further modification of the wave source, in which an outer cylindrical casing 65 is mounted within a housing 20 with its axis being perpendicular to the lengthwise direction of the housing 20. The structure of the wave source 1 may be considered to be symmetrical in construction and for this reason only one side will be described. Within the outer casing 65 is movably mounted a moving body 64 which consists of an hollow body 62 and a driving device 63. The hollow body 62 is supported movably along an axis of the outer casing 65 by means of spiral springs 66 anchored by C-rings 67. The hollow body 62 has a cylindrical inner casing 68 having a projection 68a around an inner surface of the casing 68, a magnetic plunger 70 having a central projection 70a and an annular projection 70b, the latter being threadedly engaged with the cylindrical inner casing 68 through an O-ring 69 and an outer plate 71 is connected to the plunger 70 by a bolt 72.

The driving device 63 mounted within the hollow body 62 is supported movably along the axis of the hollow body by means of spiral springs 73. The driving device 63 has a non-magnetic body 74 which is positioned at a center of the hollow body 62 to divide two magnetic circuits which will be described later, a cup-shaped inner yoke 76 and a central yoke 77 wherein the yokes 76 and 77 are connected to the non-magnetic body 74 by a magnetic bolt 75. Besides, the driving device 63 has a bobbin 78 and an outer yoke 80, the latter being threadedly engaged with the inner yoke 76. The elements such as yokes 76, 77 and 80 and magnetic bolt 75 surround the coil 79 and constitute in combination an open magnetic circuit, and the central projection 70a of the magnetic plunger 70 is located at an opened portion of the open magnetic circuit. This means that a driving source of the embodied wave source is a D.C. solenoid constituted by the annular ring 79, magnetic bolt 75, yokes 76, 77, and 80 and magnetic plunger 70.

When an electric current is applied to the coil 79 of the right hand side of FIG. 9, the hollow body 62 is driven in a direction corresponding to the left side of the drawing, while an electric current to the left hand side coil drives the hollow body 62 in the direction of right hand side. In this instance, it will be understood that the driving device 63 moves in the direction opposite to the advancing direction of the hollow body 62. In order to attain a full sealing of the wave source, a resilient layer (not shown) may be provided at the ends of the outer casing 65 at which a circumferential end of the outer plate 71 is located.

A basic operational mode of the wave source shown in FIGS. 9 and 10 will be described with reference to FIG. 11, while a driving circuit may be considered to be substantially equivalent to the electric circuit shown in FIG. 6.

Supposing that a force F is imparted to a bore hole wall through water 2 in the bore hole 3 by imparting a force $F_1$ from the driving device 63 to the hollow body 62. In this instance, while a force $F_2$ which is equivalent in magnitude but opposite in direction to the force $F_1$ is imparted to the driving device 63, an obstructive force which will be harmful to the force F, namely a reaction of the force $F_1$, will not be imparted to the bore hole wall 3 since the driving device 63 is mounted within the hollow structure 62 and separated from the water within the bore hole 3. Namely, the reaction of the force $F_1$ imparted to the hollow body 62 is completely cancelled by moving the driving 63 within the hollow body 62, and the cylindrical housing 20 maintains its original position during all the time of operation. Thus, any obstructive waves due to the reaction are not radiated toward the bore hole wall.

In the embodiment shown in FIGS. 9 to 11, the driving source consisting of the annular coil 79, magnetic bolt 75, and yokes 76, 77, and 78 is mounted to the driving device 63, but may be mounted to the hollow body 62 if needed.

According to the wave source 1 shown in FIGS. 9 to 11, P waves can be radiated by driving the hollow body 62 into a collision with the driving device 63 of the hollow body 62 to produce an abrupt pressure change, while S waves can be radiated by driving the hollow body 62 so that it does not collide with the driving device 63 to thereby minimize generation of P waves.

Although the present invention has been described with reference to the preferred embodiments thereof, many modifications and alterations can be made within the spirit of the invention.

What is claimed is:

1. An apparatus for generating P waves and S waves in a ground formation having a mechanism for imparting a force to a bore hole wall of the ground formation through bore hole water, comprising:

a housing;

a rigid body movably mounted in said housing,
said rigid body having a cylindrical magnetic plunger and protection members for protecting said cylindrical magnetic plunger, said protection members being cup shaped and fixed to ends of said cylindrical magnetic plunger;

percussive means for abruptly increasing a water pressure within said bore hole,
said percussive means having planar members of rigid materials,
said planar members being outwardly projectably mounted to opposite portions of said housing with spaces being formed between each of said planar members and opposite ends of said rigid body, said planar members being covered with resilient layers and projectable outwardly against the resilient force of said resilient layers,
said planar members each having an aperture at the central portion thereof to form a space at least between each of said protection members and each of said resilient layers;

an electrically insulating and anticorrosive liquid filled in said space formed between said protection members and said resilient layers, and a driving means for selectively driving said rigid body into a collision with said planar members of the percussive means to thereby generate P waves when said rigid body collides with said planar members of said percussive means and to thereby generate S waves when said rigid body is driven so as to not collide with said planar members of said percussive means.

2. An apparatus for generating P waves and S waves in a ground formation having a mechanism for imparting a force to a bore hole wall of the ground formation through bore hole water, comprising:

a housing having an outer casing mounted therein;

a rigid body of hollow structure having an inner casing and plungers,
said rigid body being movably supported within said outer casing by means of a spring device, and
said plungers being engaged with opposite ends of said inner casing;

a percussive means for abruptly increasing a water pressure within said bore hole; and a driving means for driving said rigid body into a collision with said percussive means, said driving means being movably mounted in said rigid body and movably supported within said inner casing by means of a spring device, said rigid body and said driving means being movable in a direction perpendicular to the axis of said bore hole, and driven in a relatively opposite direction, thereby minimizing an obstruction force due to a reaction of said rigid body.

3. An apparatus for generating P waves and S waves in a ground formation comprising a mechanism for imparting a force to a bore hole wall of the ground formation through bore hole water, wherein said apparatus comprises:
a housing;
a hollow body movably mounted in said housing;
a percussive means for abruptly increasing a water pressure within said bore hole, said percussive means being attached to opposite ends of said hollow body; and
a driving means for selectively driving said hollow body into collision with said percussive means, said driving means having a rigid portion collidable with said percussive means and being movably supported within said hollow body by means of a spring device, thereby selectively generating P waves when said driving means is driven so as to collide with said percussive means and S waves when said driving means is driven so as to not collide with said percussive means.

4. The apparatus according to claim 1, wherein said driving means has a magnetic yoke containing an electromagnetic coil.

5. The apparatus according to claim 4, wherein said magnetic yoke is attached to an inner surface of said housing.

6. The apparatus according to claim 1, wherein said driving means has a bidirectional solenoid for selectively driving said rigid body in a selected direction.

7. The apparatus according to claim 1, wherein said protection members are in the form of rings.

8. The apparatus according to claim 1, wherein said resilient layers have a spring constant small enough not to affect an outward projection of said planar members.

9. The apparatus according to claim 1, wherein said liquid is silicone oil.

10. The apparatus according to claim 1, wherein said rigid body is supported within said housing by means of spiral springs.

11. The apparatus according to claim 1, wherein said resilient layers are made of rubber.

12. The apparatus according to claim 2, wherein said driving means has a non-magnetic body and magnetic devices connected to opposite ends of said non-magnetic body, thereby driving said plungers electromagnetically.

13. The apparatus according to claim 12, wherein said magnetic devices each comprise an inner yoke, windings and an outer yoke, said outer yoke being engaged with said inner yoke to form an open magnetic circuit.

* * * * *